(12) United States Patent
Fan et al.

(10) Patent No.: US 11,505,199 B1
(45) Date of Patent: Nov. 22, 2022

(54) METHOD, APPARATUS AND DEVICE FOR CLEANING UP VEHICLE DRIVING DATA AND STORAGE MEDIUM THEREOF

(71) Applicant: Zhiji Automotive Technology Co., Ltd., Shanghai (CN)

(72) Inventors: Shiyi Fan, Shanghai (CN); Wei Zhang, Shanghai (CN); Gang Qian, Shanghai (CN); Ruixue Wang, Shanghai (CN); Fei Chen, Shanghai (CN); Xinyu Zheng, Shanghai (CN)

(73) Assignee: Zhiji Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 17/551,553

(22) Filed: Dec. 15, 2021

(30) Foreign Application Priority Data

Jun. 18, 2021 (CN) .......................... 202110674876.4

(51) Int. Cl.
*G01G 23/01* (2006.01)
*B60W 50/02* (2012.01)
(Continued)

(52) U.S. Cl.
CPC ............ *B60W 50/02* (2013.01); *B60W 40/02* (2013.01); *B60W 40/10* (2013.01); *B60W 40/12* (2013.01);
(Continued)

(58) Field of Classification Search
CPC ...... B60W 50/02; B60W 40/02; B60W 40/10; B60W 40/12; B60W 2510/242;
(Continued)

(56) References Cited

U.S. PATENT DOCUMENTS

| 6,011,461 A | 1/2000 | Luper |
| 2009/0150118 A1 | 6/2009 | Naima |

(Continued)

FOREIGN PATENT DOCUMENTS

| CN | 106297280 A | 1/2017 | |
| CN | 107403482 B | * 11/2019 | ......... G06Q 10/0639 |

(Continued)

OTHER PUBLICATIONS

The State Intellectual Property Office of People's Republic of China, First Office Action in Patent Application No. CN202110674876.4 dated Aug. 31, 2021, which is a foreign counterpart application corresponding to this U.S. Patent Application, to which this application claims priority.

(Continued)

*Primary Examiner* — Donald J Wallace
*Assistant Examiner* — Daniel M. Robert
(74) *Attorney, Agent, or Firm* — Kolitch Romano Dascenzo Gates LLC

(57) ABSTRACT

A method for cleaning up vehicle driving data includes receiving vehicle driving data of a vehicle within a predetermined time period, the vehicle driving data comprising vehicle mileage data and vehicle status data; determining a first mileage of the vehicle within the predetermined time period based on the vehicle mileage data; determining a second mileage of the vehicle within the predetermined time period based on the vehicle status data; and judging whether the first mileage is abnormal data based on the second mileage.

10 Claims, 5 Drawing Sheets

(51) Int. Cl.
*G06F 16/903* (2019.01)
*B60W 40/02* (2006.01)
*B60W 40/12* (2012.01)
*B60W 40/10* (2012.01)
*G08G 1/0967* (2006.01)

(52) U.S. Cl.
CPC ..... *G06F 16/90335* (2019.01); *G08G 1/0967* (2013.01); *B60W 2510/242* (2013.01); *B60W 2520/00* (2013.01); *B60W 2530/13* (2021.08); *B60W 2530/209* (2020.02); *B60W 2556/10* (2020.02); *B60W 2710/244* (2013.01); *G05B 2219/35226* (2013.01); *G05B 2219/35228* (2013.01)

(58) Field of Classification Search
CPC ......... B60W 2520/00; B60W 2530/13; B60W 2530/18; B60W 2050/046; B60W 60/0023; B60W 2710/244; B60W 2530/209; B60W 2556/10; G06F 16/90335; G05B 2219/35226; G05B 2219/35228; G08G 1/0967
See application file for complete search history.

(56) References Cited

U.S. PATENT DOCUMENTS

| | | | |
|---|---|---|---|
| 2011/0077816 A1 | 3/2011 | Biondo | |
| 2014/0046701 A1* | 2/2014 | Steinberg | G08G 1/20 705/4 |
| 2018/0091597 A1* | 3/2018 | Kim | G07C 5/0808 |
| 2019/0035173 A1 | 1/2019 | Harvey | |
| 2019/0041218 A1* | 2/2019 | Hirata | G01C 21/14 |
| 2020/0240794 A1* | 7/2020 | Prasser | G05D 1/0088 |

FOREIGN PATENT DOCUMENTS

| | | | | |
|---|---|---|---|---|
| CN | 110990388 A | | 4/2020 | |
| CN | 111275847 A | | 6/2020 | |
| CN | 111376822 A | | 7/2020 | |
| CN | 112254741 A | | 1/2021 | |
| CN | 112798011 B | * | 7/2021 | |
| CN | 114331477 A | * | 4/2022 | |
| CN | 114394099 A | * | 4/2022 | |
| DE | 102018201064 A1 | | 7/2019 | |
| JP | 2016103158 A | * | 6/2016 | ............ B60W 40/10 |
| KR | 20110074125 A | * | 6/2011 | |
| WO | WO-2020041929 A1 | * | 3/2020 | ............ G01C 22/00 |

OTHER PUBLICATIONS

Notification to Grant Patent Right for Invention for CN202110674876.4 dated Sep. 17, 2021.
European Search Report Communication Pursuant to Rule 62 EPC, dated Jun. 20, 2022 in Patent Application No. EP21216987.4, which is a foreign counterpart application to which this application claims priority.

* cited by examiner

METHOD, APPARATUS AND DEVICE FOR CLEANING UP VEHICLE DRIVING DATA AND STORAGE MEDIUM THEREOF

TECHNICAL FIELD

The present disclosure relates to the field of vehicles, and more specifically, to a method, apparatus and device for cleaning up vehicle driving data and a storage medium thereof.

BACKGROUND

With the advancement of science and technology, social development has entered the era of big data. Vehicles generate a large amount of data during their entire life cycle, and these data are of great value to the development of the vehicle industry and the progress of the entire society. As data contributors, users and their vehicles should be given corresponding recognition and rewards. In this way, users who are recognized and rewarded will actively invest in data contributions, thereby forming a positive and virtuous data ecological cycle. However, once a reward mechanism for users who contributes data is established, there is a possibility that someone will try to defraud rewards by tampering with the data, which will destroy the ecological cycle of data.

SUMMARY

According to a first aspect of the present disclosure, there is provided a method for cleaning up vehicle driving data, the method including: receiving vehicle driving data of a vehicle within a predetermined time period, the vehicle driving data including first vehicle driving data of a first type and second vehicle driving data of a second type convertible into the first type; converting the second vehicle driving data of the second type into the second vehicle driving data of the first type; and judging whether the first vehicle driving data of the first type is abnormal data based on the second vehicle driving data of the first type.

According to a second aspect of the present disclosure, there is provided a method for cleaning up vehicle driving data, the method including: receiving vehicle driving data of a vehicle within a predetermined time period, the vehicle driving data including first vehicle driving data of a second type convertible into a first type and second vehicle driving data of a third type convertible into the first type and different from the second type; converting the first vehicle driving data of the second type into the first vehicle driving data of the first type; converting the second vehicle driving data of the third type into the second vehicle driving data of the first type; and judging whether the first vehicle driving data of the first type is abnormal data based on the second vehicle driving data of the first type.

According to a third aspect of the present disclosure, there is provided an apparatus for cleaning up vehicle driving data, including: a receiving module configured to receive vehicle driving data of a vehicle within a predetermined time period, the vehicle driving data including first vehicle driving data of a first type and second vehicle driving data of a second type convertible into the first type; the converting module is configured to convert the second vehicle driving data of the second type into the second vehicle driving data of the first type; and a judging module configured to judge whether the first vehicle driving data of the first type is abnormal data based on the second vehicle driving data of the first type.

According to a fourth aspect of the present disclosure, there is provided an apparatus for cleaning up vehicle driving data, including: a receiving module configured to receive vehicle driving data of a vehicle within a predetermined time period, the vehicle driving data including first vehicle driving data of a second type convertible into a first type and second vehicle driving data of a third type convertible into the first type and different from the second type; a converting module configured to convert the first vehicle driving data of the second type into the first vehicle driving data of the first type, and convert the second vehicle driving data of the third type into the second vehicle driving data of the first type; and a judging module configured to judge whether the first vehicle driving data of the first type is abnormal data based on the second vehicle driving data of the first type.

According to a fifth aspect of the present disclosure, there is provided a device for cleaning up vehicle driving data. The device includes: one or more processors; and a memory storing computer-executable instructions. The computer-executable instructions, when being executed by the one or more processors, cause the one or more processor to perform the method according to the first or second aspect of the present disclosure.

According to a sixth aspect of the present disclosure, there is provided a non-transitory storage medium having computer-executable instructions stored thereon. The computer-executable instructions, when being executed by a computer, cause the computer to perform the method according to the first or second aspect of the present disclosure.

Through the following detailed description of exemplary embodiments of the present disclosure with reference to the accompanying drawings, other features and advantages of the present disclosure will become clearer.

BRIEF DESCRIPTION OF THE DRAWINGS

The foregoing and other features and advantages of the present disclosure will become clear from the following description of the embodiments of the present disclosure shown in conjunction with the accompanying drawings. The accompanying drawings are incorporated herein and form a part of the specification, and are further used to explain the principle of the present disclosure and enable those skilled in the art to make and use the present disclosure, in which.

Figure 1:
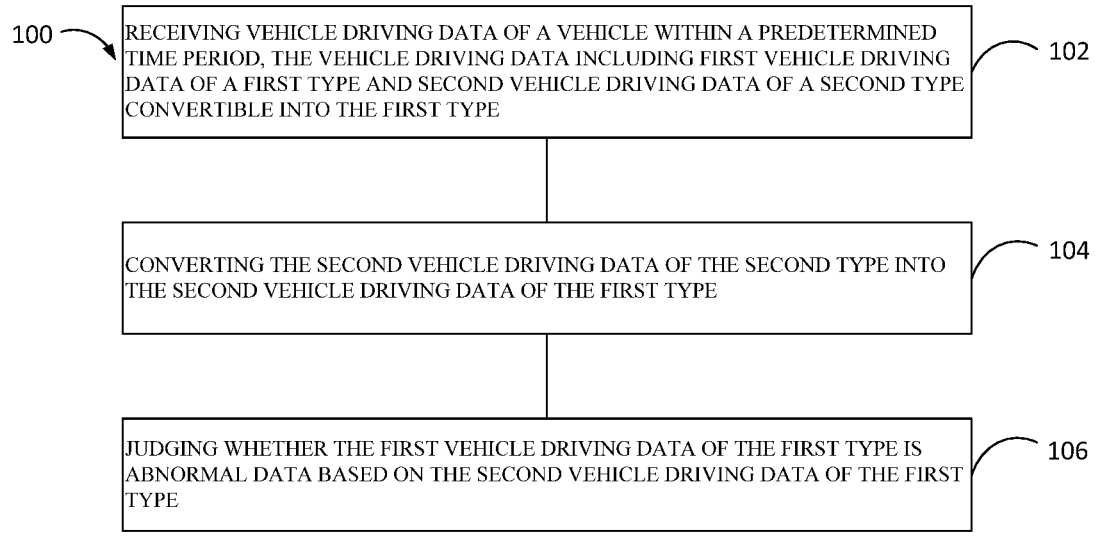
FIG. 1 is a flowchart of a method for cleaning up vehicle driving data according to some embodiments of the present disclosure.

Note that in the embodiments described below, the same reference numerals are sometimes used in common between different drawings to denote the same parts or parts with the same functions, and repeated descriptions thereof are omitted. In some cases, similar reference numerals and letters are used to indicate similar items. Therefore, once an item is defined in one figure, it may not be discussed further in subsequent figures.

For ease of understanding, the location, size, range, etc. of each structure shown in the drawings and the like may not indicate the actual location, size, range, etc. Therefore, the present disclosure is not limited to the location, size, range, etc. disclosed in the drawings and the like.

DETAILED DESCRIPTION

Hereinafter, various exemplary embodiments of the present disclosure will be described in detail with reference to the accompanying drawings. It should be noted that unless specifically stated otherwise, the relative arrangement of components and steps, numerical expressions and numerical values set forth in these embodiments do not limit the scope of the present disclosure.

The following description of at least one exemplary embodiment is actually only illustrative, and in no way serves as any limitation to the present disclosure and its application or use. That is to say, the structure and method in this document are shown in an exemplary manner to illustrate different embodiments of the structure and method in the present disclosure. However, those skilled in the art will understand that they only illustrate exemplary ways in which the present disclosure can be implemented, rather than exhaustive ways. In addition, the drawings are not necessarily drawn to scale, and some features may be exaggerated to show details of specific components.

In addition, the technologies, methods, and equipment known to those of ordinary skill in the relevant fields may not be discussed in detail, but where appropriate, the technologies, methods, and equipment should be regarded as part of the authorization specification.

In all examples shown and discussed herein, any specific value should be interpreted as merely exemplary, rather than as a limitation. Therefore, other examples of the exemplary embodiment may have different values.

As data contributors, users and their vehicles should be given corresponding recognition and rewards. In this way, users who are recognized and rewarded are motivated to actively invest in data contributions, thereby forming a positive and benign data ecological cycle. However, once a reward mechanism for users who contributes data is established, there is a possibility that someone will try to defraud rewards by tampering with the data, which will destroy the ecological cycle of data. Therefore, in order to maintain the ecological cycle of data, it is necessary to clean up the collected data to identify abnormal data, such that corresponding measures can be taken against abnormal data when rewarding users based on the data.

Vehicle driving data is driving-related data generated during driving of a vehicle. The inventors of the present application recognize that some types of vehicle driving data can be converted into other types of vehicle driving data, thereby allowing originally different types of vehicle driving data to be compared with each other after being converted into the same type. Moreover, even if there is no direct conversion relationship between some types of vehicle driving data, if these types of vehicle driving data can be converted into other vehicle driving data of the same type, then these types of vehicle driving data can also be compared with each other later after being converted into the same type. In addition, the inventors of the present application also recognize that compared to other types of vehicle driving data, some types of vehicle driving data are not easy to tamper with, or are relatively more credible, so whether the relatively less credible type of vehicle driving data is abnormal can be identified with the relatively more credible type of vehicle driving data. Moreover, even if the credibility of the two types of vehicle driving data is the same or similar, whether there is an abnormality can be judged based on the consistency of the two types of vehicle driving data after being converted into the same type. Based on the above recognition, the inventors of the present application propose a method, apparatus and device for cleaning up vehicle driving data, and a storage medium thereof, which can identify abnormal data through mutual verification between a variety of different types of vehicle driving data, thereby it can advantageously promote a positive and benign ecological cycle of data.

In the following, a method 100 for cleaning up vehicle driving data according to some embodiments of the present disclosure will be described with reference to FIG. 1. The method may be used to identify abnormal data from received vehicle data such that the abnormal data can be cleaned up (e.g., the abnormal data are removed). The method 100 may include the following steps. In step 102, vehicle driving data of a vehicle within a predetermined time period is received, in which the vehicle driving data may include first vehicle driving data of a first type and second vehicle driving data of a second type convertible to the first type. In step 104, the second vehicle driving data of the second type is converted into the second vehicle driving data of the first type. In step 106, whether the first vehicle driving data of the first type is abnormal data is judged based on the second vehicle driving data of the first type.

By converting the second vehicle driving data originally of the second type into the first type, the converted second vehicle driving data are comparable with the first vehicle driving data, and therefore whether the first vehicle driving data are abnormal data can be identified.

In some embodiments, the vehicle driving data may further include third vehicle driving data of a third type convertible into the first type and different from the second type. The method 100 may further include: when it is judged that the first vehicle driving data of the first type is not abnormal data based on the second vehicle driving data of the first type, converting the third vehicle driving data of the third type into the third vehicle driving data of the first type; and judging whether the first vehicle driving data of the first type is abnormal data based on the third vehicle driving data of the first type.

If there are more other types of vehicle driving data convertible into the first type, then these other types of vehicle driving data can also be converted into the first type to further judge whether the first vehicle driving data is abnormal data. In some embodiments, for various types of vehicle driving data convertible into the first type, as long as it is judged from one type of vehicle driving data that the first vehicle driving data is abnormal data, the first vehicle driving data can be determined as abnormal data. In some embodiments, various types of vehicle driving data convertible into the first type may be ranked by credibility. In some examples, the vehicle driving data with the highest credibility convertible into the first type may be used to judge whether the first vehicle driving data of the first type is abnormal data. In some examples, the vehicle driving data with lower credibility convertible to the first type may be used to judge whether the first vehicle driving data of the first type is abnormal data first, and if the judgment result is no, the vehicle driving data with higher credibility convertible into the first type may be used to judge whether the first vehicle driving data of the first type is abnormal data.

In some embodiments, the vehicle driving data may further include third vehicle driving data of a third type convertible to the first type and different from the second type. The method 100 may further include: converting the third vehicle driving data of the third type into the third vehicle driving data of the first type; and judging whether the second vehicle driving data of the first type is abnormal data based on the third vehicle driving data of the first type.

As mentioned above, even though there may not be a direct conversion relationship between the second vehicle driving data of the second type and the third vehicle driving data of the third type, they can be compared with each other after being converted into the first type.

In some embodiments, the method 100 may further include storing the first vehicle driving data and information indicating whether the first vehicle driving data is abnormal data in a database.

The method for cleaning up vehicle driving data according to the present disclosure may be implemented by, for example, a server, a cloud computing platform, or any other suitable computing device, apparatus, or system. The predetermined time period may be set by the background to any suitable time period, such as 12 hours, 6 hours, 5 hours, 4 hours, 3 hours, 2 hours, 1 hour, 0.5 hours, and so on. The method of the present disclosure may be performed at predetermined time intervals. For example, vehicle driving data is received from a vehicle once an hour, and then the received vehicle driving data is cleaned up according to the method of the present disclosure.

In some embodiments, the first type, the second type, and the third type may be selected from one of the following: vehicle mileage, vehicle location, vehicle speed, and vehicle energy. As a non-limiting example, the first type may be the vehicle mileage, the second type may be the vehicle location, and the third type may be the vehicle speed. In this case, the first vehicle driving data of the first type may be a mileage of the vehicle within the predetermined time period, the second vehicle driving data of the first type may be a mileage converted based on the vehicle location of the vehicle within the predetermined time period, and the third vehicle driving data of the first type may be a mileage converted based on the vehicle speed of the vehicle within the predetermined time period.

Vehicle mileage is one of the most well-known digital measurement methods in vehicle industry. Various types of vehicle driving data may be converted into vehicle mileage. In addition, the greater the vehicle mileage, the longer the user drives the vehicle, and the more data the vehicle will generate accordingly. Therefore, the vehicle mileage may be used to characterize the user's data contribution. Therefore, in some cases, the user can be rewarded based on the vehicle mileage, so as to further enhance the user's enthusiasm and initiative in daily continuous driving, and ultimately stimulate more data generation. The most direct source of vehicle mileage is the odometer. However, the odometer data is relatively easy to tamper with. For example, some odometers use pulse signals to calculate mileage, and the user can easily increase mileage by simulating pulse signals, thereby cheating rewards. Therefore, the method for cleaning up vehicle driving data of the present disclosure will be further described by taking the first type being the vehicle mileage as a non-limiting example.

Hereinafter, a method 300 for cleaning up vehicle driving data according to some embodiments of the present disclosure will be described with reference to FIGS. 3 to 7. In such an embodiment, the first vehicle driving data of the first type may be vehicle mileage data, and the second vehicle driving data of the second type may be vehicle status data. The vehicle status data is data indicating the status of the vehicle. The status of the vehicle includes but is not limited to speed, acceleration, location, vehicle heading, energy, etc. of the vehicle.

Figure 3:
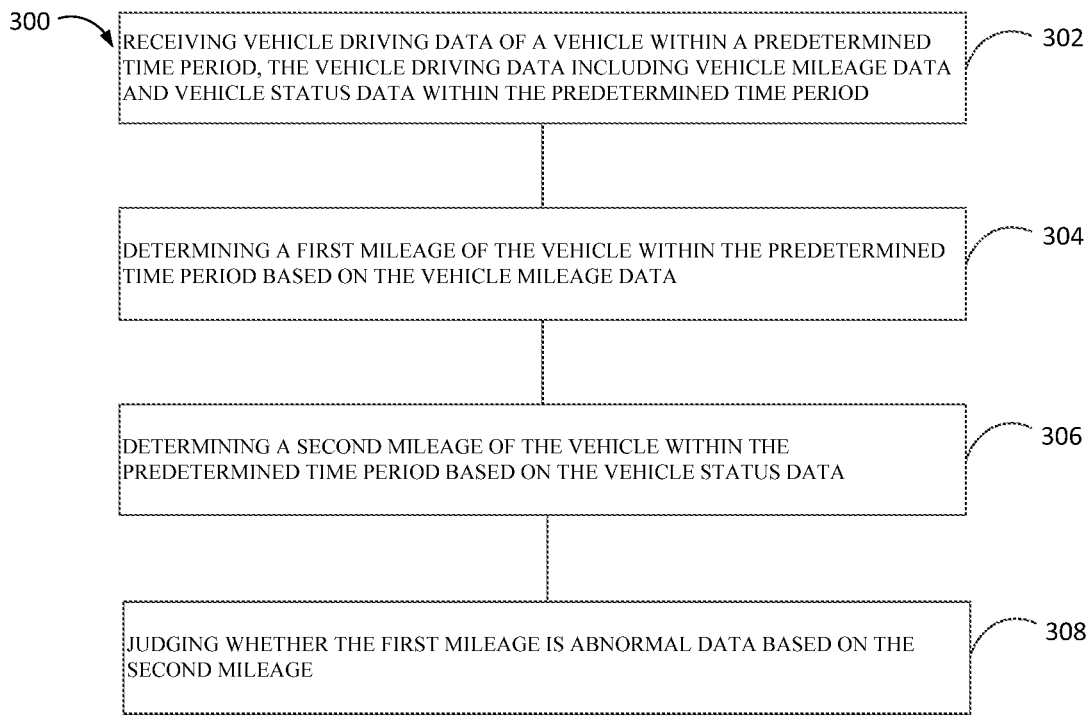
FIG. 3 is a flowchart of a method for cleaning up vehicle driving data according to one embodiment of the present disclosure.

As shown in FIG. 3, the method 300 may include the following steps. In step 302, vehicle driving data of a vehicle within a predetermined time period is received, in which the vehicle driving data may include vehicle mileage data and vehicle status data within the predetermined time period. In step 304, a first mileage of the vehicle within the predetermined time period is determined based on the vehicle mileage data. In step 306, a second mileage of the vehicle within the predetermined time period is determined based on the vehicle status data. In step 308, whether the first mileage is abnormal data is judged based on the second mileage.

In some embodiments, the vehicle mileage data may include first odometer data at a starting time point of the predetermined time period and second odometer data at an ending time point of the predetermined time period. Therefore, the first mileage determined based on the vehicle mileage data may be a difference between the second odometer data and the first odometer data.

In some embodiments, the vehicle status data may include first vehicle location data. The first vehicle location data may include one or more first vehicle locations at one or more first time points within the predetermined time period. Each of the one or more first vehicle locations is associated with a corresponding one of one or more first sub-time periods obtained by dividing the predetermined time period according to the one or more first time points. The vehicle location data may be provided by the vehicle's on-board positioning system or a positioning module of a mobile device (e.g., a mobile phone of a vehicle occupant) on the vehicle, and may be, but not limited to, GPS location data. For example, the predetermined time period is 9:00-10:00, the first time points are 9:10, 9:30, and 9:50, and the first sub-time periods obtained by dividing the predetermined time period according to the first time points may be 9:00-9:20, 9:20-9:40, and 9:40-10:00. The one or more first time points may or may not be equally spaced, and the one or more first sub-time periods may or may not be of equal length. The first time points are within a corresponding first sub-time period, and may be end points of the first sub-time period. When the number of the first sub-time periods is 1, the first sub-time period may be the predetermined time period.

Figure 4:
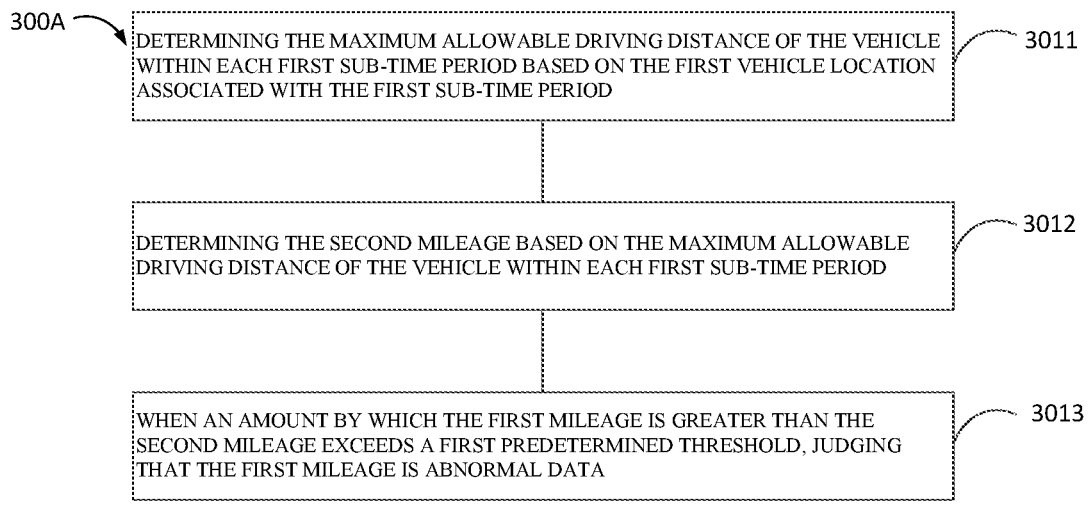
FIG. 4 is a flowchart of a method for cleaning up vehicle driving data according to another embodiment of the present disclosure.

In such an embodiment, the method 300 may include a method 300A as shown in FIG. 4 to judge whether the first mileage is abnormal data based on the second mileage, and specifically may include the following steps. In step 3011, the maximum allowable driving distance of the vehicle within each first sub-time period is determined based on the first vehicle location associated with the first sub-time period. In step 3012, the second mileage is determined based on the maximum allowable driving distance of the vehicle within each first sub-time period. In step 3013, when an amount by which the first mileage is greater than the second mileage exceeds a first predetermined threshold, it is judged that the first mileage is abnormal data.

A road section where the vehicle is located may be determined based on the location of the vehicle, and then the maximum speed limit of the road section may be retrieved according to the road section where the vehicle is located (e.g., the maximum speed limit of expressways does not exceed 120 km/h, and the maximum speed limit of some urban roads does not exceed 50 km/h), such that the maximum allowable driving distance can be determined. In some embodiments, determining the second mileage of the vehicle within the predetermined time period may include: determining the maximum vehicle speed allowed for a road section where the vehicle is located within each first sub-time period based on the first vehicle location associated with the first sub-time period; determining the maximum allowable driving distance speed within each first sub-time period based on a length of each first sub-time period and the maximum vehicle speed allowed for the road section where the vehicle is located within the first sub-time period; and determining the second mileage of the vehicle within the predetermined time period based on a sum of the maximum allowable driving distances within the first sub-time period.

Since the vehicle may undergo multiple road sections switching within the predetermined time period, and the maximum vehicle speed allowed for each road section may be different, resulting in that the one or more first time points may not necessarily cover all road sections that the vehicle has passed within the predetermined time period, the true maximum allowable driving distance may be greater than the determined maximum allowable driving distance. Taking this into consideration, setting the first predetermined threshold may provide an appropriate margin range. The first predetermined threshold may be set according to specific conditions, or may be an empirically set value. The first predetermined threshold may be greater than or equal to zero.

In addition, since it is assumed that the user has only the motivation to increase the mileage in order to obtain rewards and will not actively decrease the mileage, the first mileage can be judged as abnormal data only when the amount by which the first mileage is greater than the second mileage exceeds the first predetermined threshold. In some cases, it is not ruled out that the user will decrease the mileage (e.g., disguising an old car as a new car), so the first mileage may also be judged as abnormal data when the difference between the first mileage and the second mileage exceeds the first predetermined threshold.

In some embodiments, the method 300A may further include when the amount by which the first mileage is greater than the second mileage exceeds the first predetermined threshold: receiving one or more surrounding environment images of the vehicle at the one or more first time points; and judging whether a road section determined based on the surrounding environment image at each first time point is consistent with the road section determined based on the first vehicle location at the first time point, and if they are consistent, judging that the first mileage is abnormal data, and if they are inconsistent, removing the first vehicle location at the first time point from the first vehicle location data and re-determining the second mileage.

In some embodiments, the vehicle status data may include second vehicle location data. The second vehicle location data may include one or more second vehicle locations at one or more second time points within the predetermined time period. The method 300 may include a method 300B shown in FIG. 5 to judge whether the first mileage is abnormal data based on the second mileage, and specifically may include the following steps. In step 3021, a driving distance of the vehicle between every two adjacent second time points in the one or more second times is determined based on the second vehicle locations at the two adjacent second time points. In step 3022, the second mileage is determined based on the driving distance of the vehicle between every two adjacent second time points in the one or more second time points. In step 3023, when the amount by which the first mileage is greater than the second mileage exceeds a second predetermined threshold, it is judged that the first mileage is abnormal data.

Since road section switching is less frequent than location changes, the second time points required to determine the driving distance based on the vehicle location may be more than the first time points required to determine the maximum vehicle speed allowed for the road section based on the vehicle location. The one or more second time points may include the one or more time points (i.e., the second vehicle location data may include the first vehicle location data), and may further include additional or alternative time points. The second time points may or may not be equally spaced. For example, an interval of the second time points may be 60 s, 50 s, 40 s, 30 s, 20 s, 10 s, 5 s, etc.

Setting the second predetermined threshold may provide an appropriate margin range. The second predetermined threshold may be set according to specific conditions, or may be an empirically set value. The second predetermined threshold may be greater than or equal to zero. In some embodiments, the first mileage may be judged as abnormal data when the difference between the first mileage and the second mileage exceeds the second predetermined threshold.

In some embodiments, in step 3022, the second mileage may be determined based on the driving distance between every two adjacent second time points in the one or more second time points and a first tolerance deviation coefficient. The first tolerance deviation coefficient may be set according to specific conditions, or may be an empirically set value. In some examples, the first tolerance deviation coefficient may be greater than or equal to 1 (e.g., 1.5, 1.3, and 1.1). In some examples, the first tolerance deviation coefficient may be less than or equal to 1 (e.g., 0.9, 0.8, and 0.7). In some embodiments, the first tolerance deviation coefficient is set based on at least one of the following: a time interval between two adjacent second time points; or a variance of a length of a feasible route between the second vehicle locations at two adjacent time points. In some examples, a different first tolerance deviation coefficient may be applied to the driving distance between other two adjacent second time points. For example, the smaller the time interval between two adjacent second time points is, the smaller the first tolerance deviation coefficient may be set. For example, the smaller the variance of the length of one or more feasible routes between the second vehicle locations at two adjacent time points, the smaller the first tolerance deviation coefficient may be set. In some examples, the first tolerance deviation coefficient may be applied to a sum of the driving distance between every two adjacent second time points in the one or more second time points, such that the second mileage is equal to the sum multiplied by the first tolerance deviation coefficient.

In some embodiments, in step 3021, determining the driving distance of the vehicle between every two adjacent second time points in the one or more second time points based on the second vehicle locations at the two adjacent second time points may include: retrieving map data to determine a feasible route between the second vehicle locations at two adjacent time points; and determining the driving distance of the vehicle between two adjacent second time points based on a length of the feasible route. When there are multiple feasible routes between the second vehicle locations at two adjacent time points, for example, the longest or shortest feasible route may be selected, or the feasible route with the best traffic condition may be selected, or when the vehicle status data includes vehicle heading data, it is also possible to select a feasible route in combination with the vehicle heading of the vehicle at a previous time point in the two adjacent time points.

In some embodiments, the vehicle status data may include vehicle speed data. The vehicle speed data may include one or more vehicle speeds at one or more third time points within the predetermined time period. Each of the one or more vehicle speeds is associated with a corresponding one of one or more third sub-time periods obtained by dividing the predetermined time period according to the one or more third time points. The method 300 may include, for example, a method 300C shown in FIG. 6 to judge whether the first mileage is abnormal data based on the second mileage, and specifically may include the following steps. In step 3031, a driving distance of the vehicle within each third sub-time period is determined based on the vehicle speed associated with the third sub-time period. In step 3032, the second mileage is determined based on the driving distance of the vehicle within each third sub-time period. In step 3033, when the amount by which the first mileage is greater than the second mileage exceeds a third predetermined threshold, it is judged that the first mileage is abnormal data.

In some embodiments, the vehicle status data may further include vehicle acceleration data. The vehicle acceleration data may include one or more vehicle accelerations at the one or more third time points within the predetermined time period. The method 300C may determine the driving distance of the vehicle within the third sub-time period based on the vehicle speed associated with the third sub-time period and the corresponding vehicle acceleration in step 3031.

The third time points for acquiring the vehicle speed may coincide with one or more of the first time points for acquiring the first vehicle location or the second time points for acquiring the second vehicle location, or may be different time points. The third time points may or may not be equally spaced. For example, an interval of the third time points may be 60 s, 50 s, 40 s, 30 s, 20 s, 10 s, 5 s, and so on. The method of dividing and obtaining the third sub-time periods according to the third time points may be similar to the foregoing method of obtaining the first sub-time periods, which will not be repeated here.

Setting the third predetermined threshold may provide an appropriate margin range. The third predetermined threshold may be set according to specific conditions, or may be an empirically set value. The third predetermined threshold may be greater than or equal to zero. In some embodiments, the first mileage may be judged as abnormal data when the difference between the first mileage and the second mileage exceeds the third predetermined threshold.

In some embodiments, in step 3032, the second mileage may be determined based on the driving distance of the vehicle within each third sub-time period and a second tolerance deviation coefficient. The second tolerance deviation coefficient may be set according to specific conditions, or may be an empirically set value. In some examples, the second tolerance deviation coefficient may be greater than or equal to 1 (e.g., 1.5, 1.3, and 1.1). In some examples, the second tolerance deviation coefficient may be less than or equal to 1 (e.g., 0.9, 0.8, and 0.7). In some embodiments, the second tolerance deviation coefficient is set based on at least one of the following: a length of the third sub-time period; the vehicle speed associated with the third sub-time period; or a variance of the one or more vehicle speeds. When the vehicle status data includes vehicle acceleration data, the second tolerance deviation coefficient may also be set based on the vehicle acceleration. In some examples, different second tolerance deviation coefficients may be applied to the driving distances within different third sub-time periods. For example, the shorter the third sub-time period is, the smaller the second tolerance deviation coefficient may be set. For example, the smaller a difference between an average value of the vehicle speed associated with an adjacent third sub-time period of a third sub-time period and the vehicle speed associated with the third sub-time period is, the smaller the second tolerance deviation coefficient may be set. In some examples, the second tolerable deviation coefficient may be applied to a sum of the driving distances of the vehicle within the third sub-time periods, such that the second mileage is equal to the sum multiplied by the first tolerable deviation coefficient. In such an example, for example, the smaller the variance of the one or more vehicle speeds is, the smaller the second tolerance deviation coefficient may be set.

Figure 7:
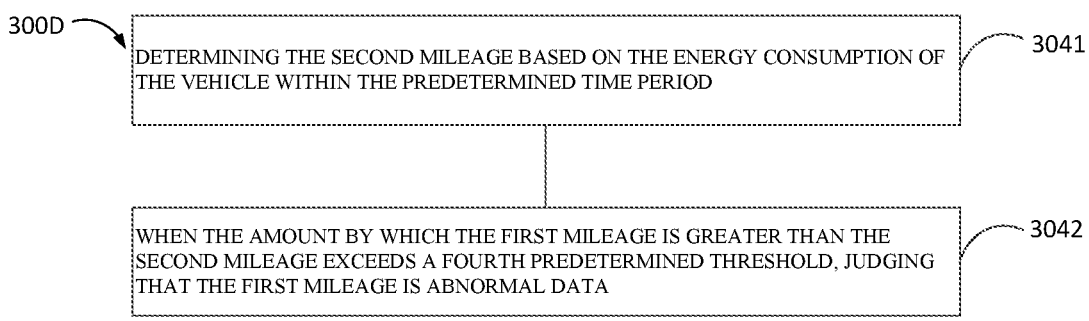
FIG. 7 is a flowchart of a method for cleaning up vehicle driving data according to another embodiment of the present disclosure.

In some embodiments, the vehicle status data may include vehicle energy data. The vehicle energy data may include the energy consumption of the vehicle within the predetermined time period. The method 300 may include a method 300D as shown in FIG. 7 to judge whether the first mileage is abnormal data based on the second mileage, and specifically may include the following steps. In step 3041, the second mileage is determined based on the energy consumption of the vehicle within the predetermined time period. In step 3042, when the amount by which the first mileage is greater than the second mileage exceeds a fourth predetermined threshold, it is judged that the first mileage is abnormal data.

When the vehicle is a fuel vehicle, the vehicle energy data may indicate the fuel consumption level of the vehicle. When the vehicle is a new energy vehicle (such as an electric vehicle), the vehicle energy data may indicate the new energy consumption level of the vehicle (such as consumption of electricity). For a known type of vehicle, the energy level consumed per unit driving distance may be known, and thus the driving distance of the vehicle within the predetermined time period may be calculated or converted from the energy consumption of the vehicle within the predetermined time period.

Setting the fourth predetermined threshold may provide an appropriate margin range. The fourth predetermined threshold may be set according to specific conditions, or may be an empirically set value. The fourth predetermined threshold may be greater than or equal to zero. In some embodiments, the first mileage may be judged as abnormal data when the difference between the first mileage and the second mileage exceeds the fourth predetermined threshold.

In addition to the methods illustrated in FIGS. 4 to 7, the method 300 may further include other methods for judging whether the first mileage is abnormal data. In some embodiments, the vehicle status data may include vehicle route data. The vehicle route data may include a driving route of the vehicle from a starting vehicle location of the vehicle at the starting time point of the predetermined time period to an ending vehicle location of the vehicle at the ending time point of the predetermined time period. Thus, in some examples, the method 300 may further include: querying a database to retrieve a first mileage indicated as not abnormal data from other vehicle, the first mileage of the other vehicle being derived from the other vehicle driving along the driving route from the starting vehicle location to the ending vehicle location; comparing the first mileage of the vehicle with the first mileage of the other vehicle; and when an amount by which the first mileage of the vehicle is greater than the first mileage of the other vehicle exceeds a fifth predetermined threshold, it is judged that the first mileage of the vehicle is abnormal data. In other examples, the method 300 may further include: querying a database to retrieve a first historical mileage from the vehicle indicated as not abnormal data, the first historical mileage being derived from the vehicle having driven along the driving route from the starting vehicle location to the ending vehicle location (e.g., the historical mileage of the vehicle itself); comparing the first mileage of the vehicle with the first historical mileage of the vehicle; and when an amount by which the first mileage of the vehicle is greater than the first historical mileage of the vehicle exceeds a sixth predetermined threshold, judging that the first mileage of the vehicle is abnormal data. As a result, data from the other vehicle that has been identified as having no abnormality or historical data from the vehicle itself that has been identified as having no abnormality may be used to verify data to be identified of the vehicle. Setting the fifth or sixth predetermined threshold may provide an appropriate margin range. The fifth or sixth predetermined threshold may be set according to specific conditions, or may be an empirically set value. The fifth or sixth predetermined threshold may be greater than or equal to zero. In some embodiments, the first mileage may be judged as abnormal data when the difference between the first mileage and the second mileage exceeds the fifth or sixth predetermined threshold.

In some embodiments, the method 300 may further include storing the first mileage and information indicating whether the first mileage is abnormal data in a database.

Several non-limiting example methods for judging whether the first mileage is abnormal data have been described above, but the present disclosure is not limited thereto. Moreover, when the judgment result that the first mileage is abnormal data is not obtained based on one of these methods, other of these methods may be used for further judgment.

Figure 5:
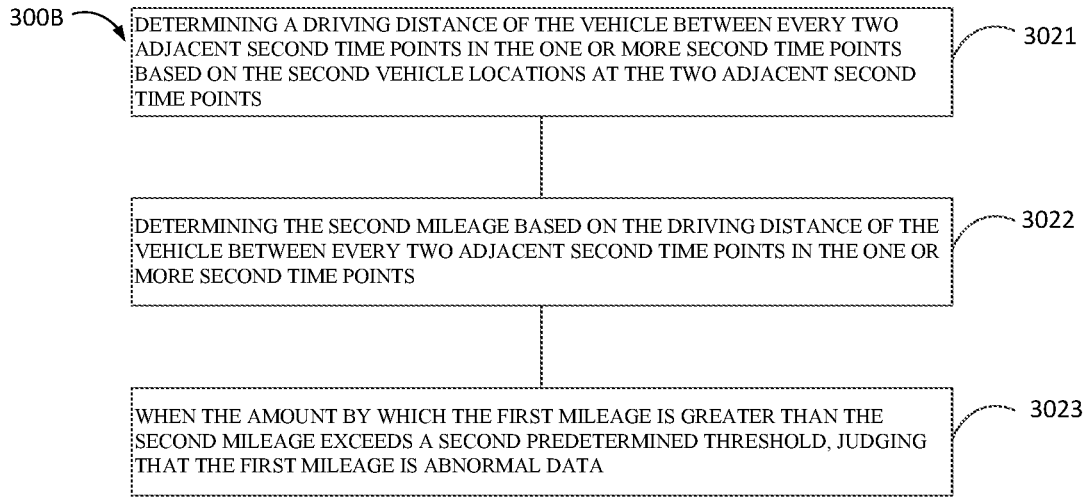
FIG. 5 is a flowchart of a method for cleaning up vehicle driving data according to another embodiment of the present disclosure.

For example, returning to the method 300A of FIG. 4, after the second mileage is determined based on the maximum allowable driving distance of the vehicle within the predetermined time period in step 3012, when the amount by which the first mileage is greater than the second mileage does not exceed the first predetermined threshold or when the first mileage is not greater than the second mileage, the method shown in FIG. 5 may also be used continuously. Specifically, the vehicle status data may include second vehicle location data. The second vehicle location data may include one or more second vehicle locations at one or more second time points within the predetermined time period. The method 300A, after step 3012, may further include when the amount by which the first mileage is greater than the second mileage does not exceed the first predetermined threshold or when the first mileage is not greater than the second mileage: determining a driving distance of the vehicle between every two adjacent second time points in the one or more second time points based on the second vehicle locations at the two adjacent second time points; determining a third mileage based on the driving distance of the vehicle between every two adjacent vehicles in the one or more second time points; and when an amount by which the first mileage is greater than the third mileage exceeds a second predetermined threshold, the first mileage is judged as abnormal data.

Figure 6:
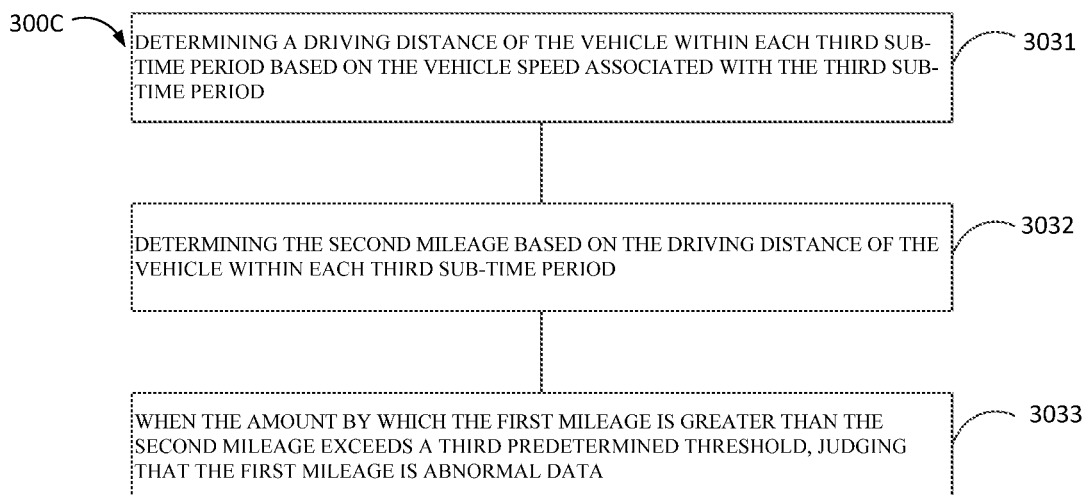
FIG. 6 is a flowchart of a method for cleaning up vehicle driving data according to another embodiment of the present disclosure.

In addition, the method shown in FIG. 6 may also be used continuously instead. Specifically, the vehicle status data may include vehicle speed data. The vehicle speed data may include one or more vehicle speeds at one or more third time points within the predetermined time period. Each of the one or more vehicle speeds is associated with a corresponding one of one or more third sub-time periods obtained by dividing the predetermined time period according to the one or more third time points. The method 300A, after step 3012, may further include when the amount by which the first mileage is greater than the second mileage does not exceed the first predetermined threshold or when the first mileage is not greater than the second mileage: determining a driving distance of the vehicle within each third sub-time period based on the vehicle speed associated with the third sub-time period; determining a fourth mileage based on the driving distance of the vehicle within each third sub-time period; and when an amount by which the first mileage is greater than the fourth mileage exceeds the third predetermined threshold, judging that the first mileage is abnormal data.

In addition, the method shown in FIG. 7 may also be used continuously instead. Specifically, the vehicle status data may include vehicle energy data. The vehicle energy data may include the energy consumption of the vehicle within the predetermined time period. The method 300A, after step 3012, may further include when the amount by which the first mileage is greater than the second mileage exceeds the first predetermined threshold or when the first mileage is not greater than the second mileage: determining a fifth mileage based on the energy consumption of the vehicle within the predetermined time period; and when an amount by which the first mileage is greater than the fifth mileage exceeds the fourth predetermined threshold, judging that the first mileage is abnormal data.

Additionally or alternatively, the following methods can be used continuously to verify the to-be-identified data of the vehicle: the above method of using data from other vehicle that has been identified as having no abnormality or the above method of using historical data from the vehicle that has been identified as having no abnormality or other appropriate methods for identifying abnormal data may also be used instead. Moreover, when based on a second method among these methods, the judgment result that the first mileage is abnormal data has not been obtained, other methods may also be used for further judgment.

Figure 2:
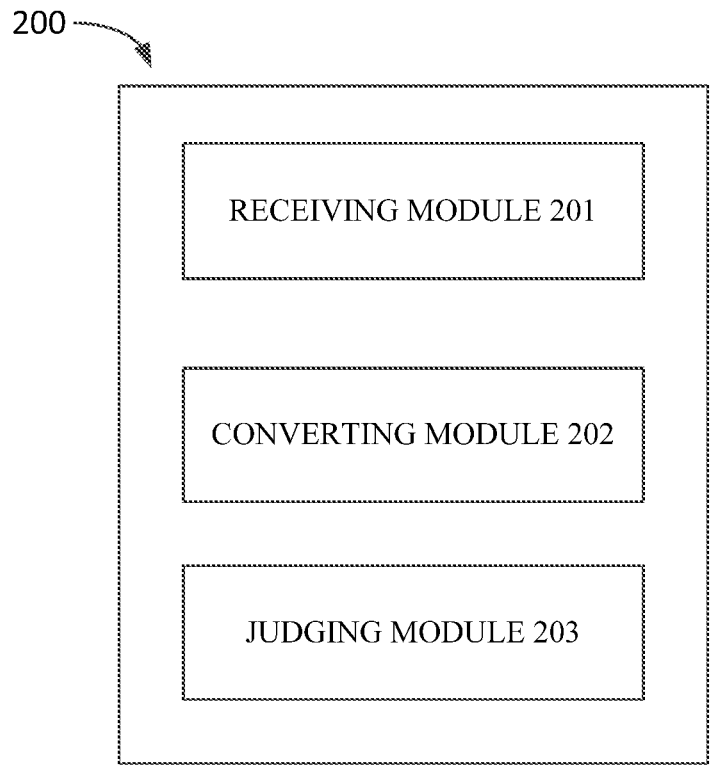
FIG. 2 is a block diagram of an apparatus for cleaning up vehicle driving data according to some embodiments of the present disclosure.

FIG. 2 shows an apparatus 200 for cleaning up vehicle driving data according to some embodiments of the present disclosure, which includes a receiving module 201, a converting module 202, and a judging module 203. The receiving module 201 may be configured to receive vehicle driving data of a vehicle within a predetermined time period, in which the vehicle driving data may include first vehicle driving data of a first type and second vehicle driving data of a second type convertible into the first type. The converting module 202 may be configured to convert the second vehicle driving data of the second type into the second vehicle driving data of the first type. The judging module 203 may be configured to judge whether the first vehicle driving data of the first type is abnormal data based on the second vehicle driving data of the first type. The apparatus 200 may also be used to perform the methods 100 and 300 for cleaning up vehicle driving data in any of the above embodiments, and details are not described herein again.

Figure 8:
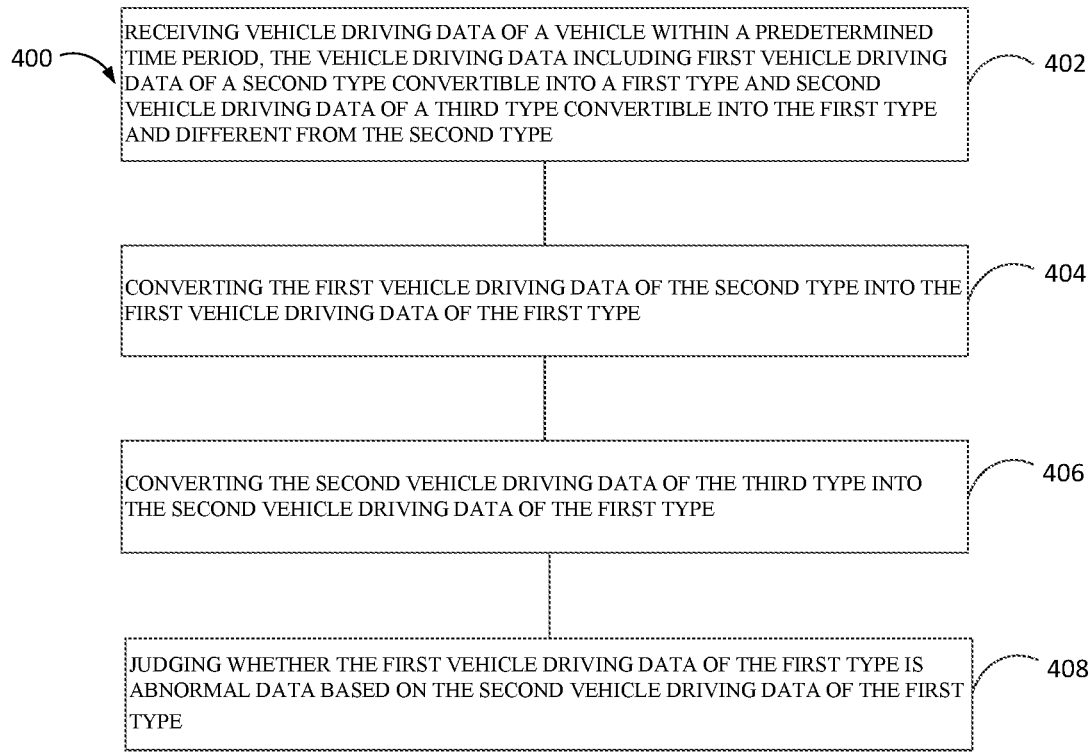
FIG. 8 is a flowchart of a method for cleaning up vehicle driving data according to another embodiment of the present disclosure.

In addition, as mentioned above, even if there is no direct conversion relationship between vehicle driving data of different types, the different types of vehicle driving data can be compared with each other after being converted into the same type. FIG. 8 shows a method 400 for cleaning up vehicle driving data according to other embodiments of the present disclosure. The method 400 may include the following steps. In step 402, vehicle driving data of a vehicle within a predetermined time period is received, in which the vehicle driving data includes the first vehicle driving data of a second type convertible into a first type and the second vehicle driving data of a third type convertible into the first type and different from the second type. In step 404, the first vehicle driving data of the second type is converted into the first vehicle driving data of the first type. In step 406, the second vehicle driving data of the third type is converted into the second vehicle driving data of the first type. In step 408, whether the first vehicle driving data is abnormal data is judged based on the second vehicle driving data of the first type.

The method 500 for cleaning up vehicle driving data according to some embodiments of the present disclosure will be further described hereinafter by taking the first type being vehicle mileage as a non-limiting example. In such an embodiment, the first type may be vehicle mileage, the first vehicle driving data of the second type may be first vehicle status data, and the second vehicle driving data of the third type may be second vehicle status data.

Figure 9:
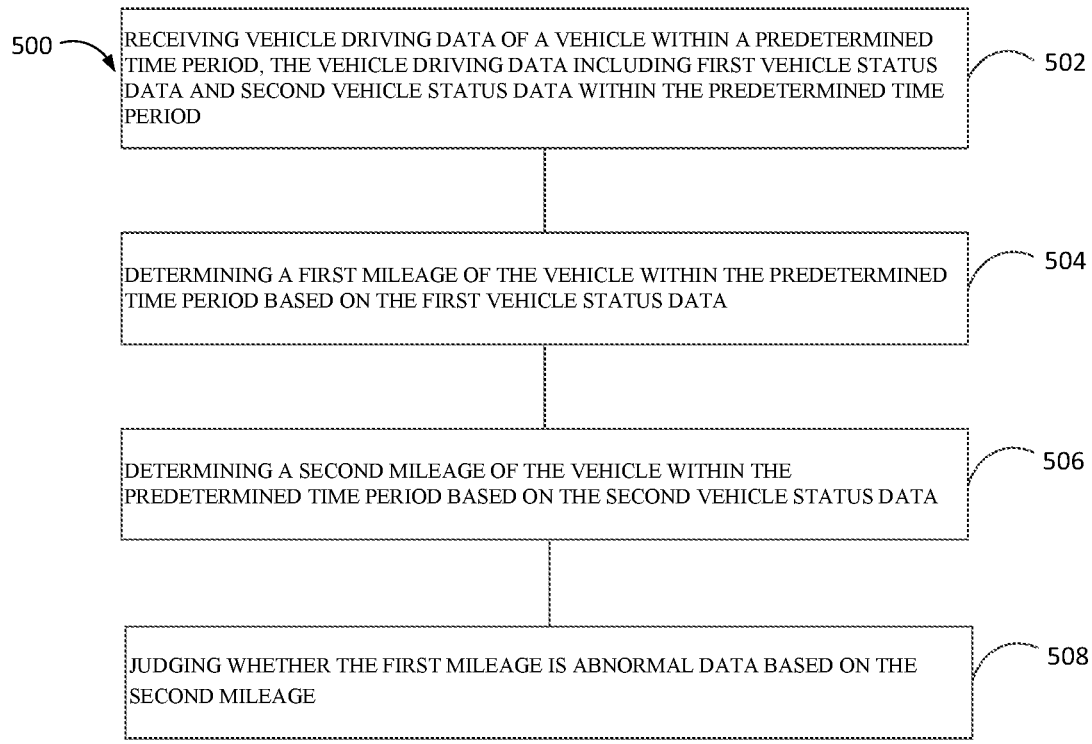
FIG. 9 is a method for cleaning up vehicle driving data according to another of the present disclosure.

As shown in FIG. 9, the method 500 may include the following steps. In step 502, vehicle driving data of a vehicle within a predetermined time period is received, in which the vehicle driving data may include first vehicle status data and second vehicle status data within the predetermined time period. In step 504, a first mileage of the vehicle within the predetermined time period is determined based on the first vehicle status data. In step 506, a second mileage of the vehicle within the predetermined time period is determined based on the second vehicle status data; and whether the first mileage is abnormal data is judged based on the second mileage. In addition, the vehicle driving data may further include third vehicle status data or more vehicle status data. When the judgment result that the first mileage is abnormal data is not obtained based on the second mileage, whether the first mileage is abnormal data may be further judged according to the mileage determined based on the third vehicle status data or more vehicle status data.

In some embodiments, the first vehicle status data may include vehicle location data. The vehicle location data may include one or more vehicle locations at one or more first time points within the predetermined time period. The second vehicle status data may include vehicle speed data. The vehicle speed data may include one or more vehicle speeds at one or more second time points within the predetermined time period. Each of the one or more vehicle speeds is associated with a corresponding one of one or more second sub-time periods obtained by dividing the predetermined time period according to the one or more second time points. Determining the first mileage of the vehicle within the predetermined time period may include determining a driving distance of the vehicle between every two adjacent first time points in the one or more first time points based on the vehicle locations at the two adjacent first time points, and determining the first mileage based on the driving distance of the vehicle between every two adjacent first time points in the one or more first time points; determining the second mileage of the vehicle within the predetermined time period may include determining a driving distance of the vehicle within each second sub-time period based on the vehicle speed associated with the second sub-time period, and determining the second mileage based on the driving distance of the vehicle within each second sub-time period; and judging the first mileage is abnormal data may include judging that the first mileage is abnormal data when an amount by which the first mileage is greater than the second mileage exceeds a predetermined threshold. The method of determining the mileage based on the vehicle location data or the vehicle speed data may be similar to the foregoing embodiment, and will not be repeated here. For example, when the mileage determined based on the vehicle speed data does not yield a judgment result that the mileage determined based on the vehicle location data is abnormal data, whether the mileage determined based on the vehicle energy data is abnormal data may be further judged based on the vehicle location data.

Figure 10:
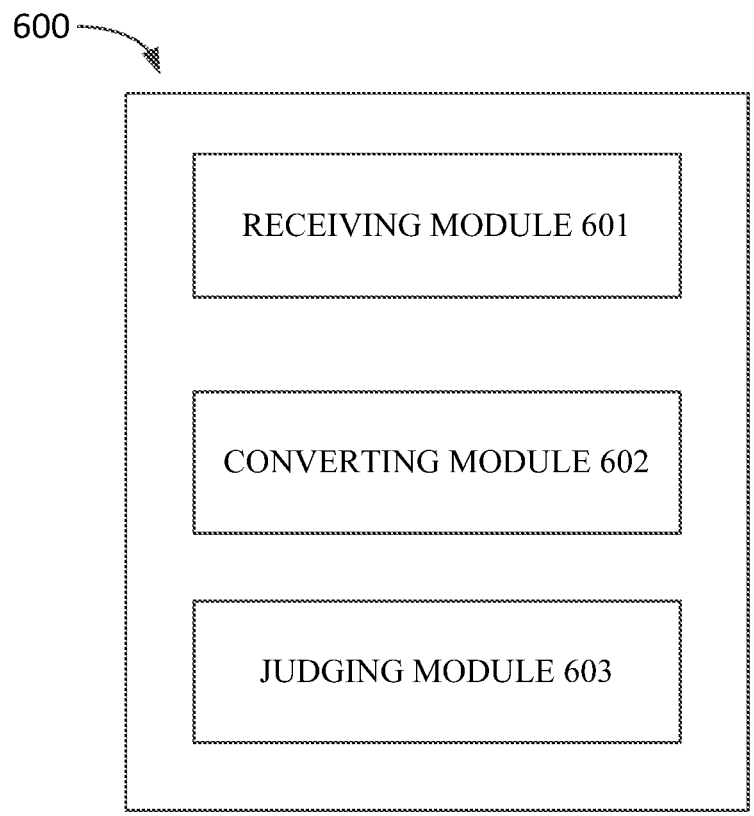
FIG. 10 is a block diagram of an apparatus for cleaning up vehicle driving data according to some embodiments of the present disclosure.

FIG. 10 shows an apparatus 600 for cleaning up vehicle driving data according to some embodiments of the present disclosure, which includes a receiving module 601, a converting module 602 and a judging module 603. The receiving module 601 may be configured to receive vehicle driving data of a vehicle within a predetermined time period. The vehicle driving data may include first vehicle driving data of a second type convertible into a first type and second vehicle driving data having a third type convertible into the first type and different from the second type. The converting module 602 may be configured to convert the first vehicle driving data of the second type into the first vehicle driving data of the first type. The converting module 602 may also be configured to convert the second vehicle driving data of the third type into the second vehicle driving data of the first type. The determining module 603 may be configured to judge whether the first vehicle driving data of the first type is abnormal data based on the second vehicle driving data of the first type. The apparatus 600 may also be used to perform the methods 400 and 500 for cleaning up vehicle driving data in any of the above embodiments, and details are not described herein again.

Figure 11:
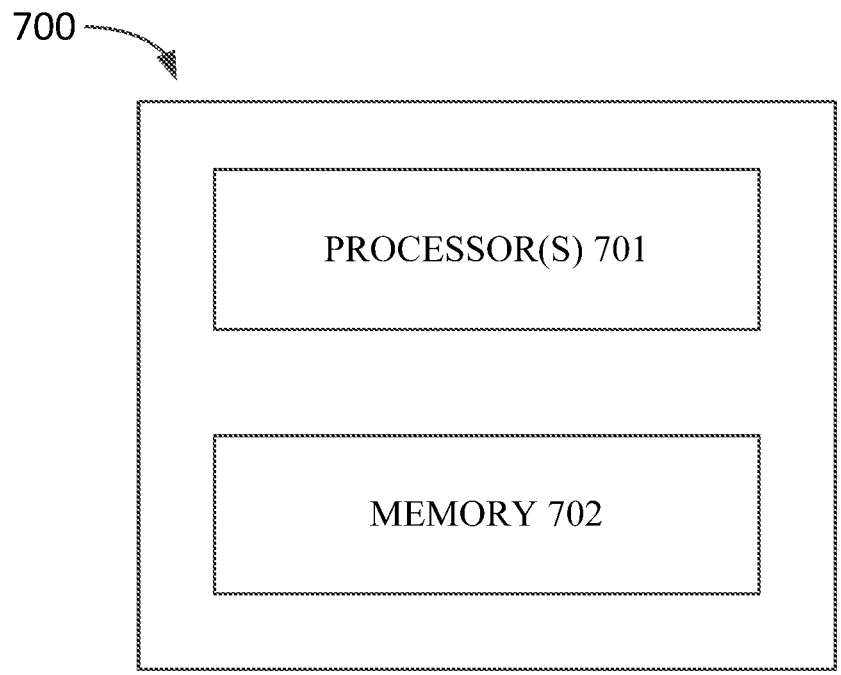
FIG. 11 is a block diagram of an apparatus for cleaning up vehicle driving data according to some embodiments of the present disclosure.

The present disclosure also provides a device for cleaning up vehicle driving data. A device 700 for cleaning up vehicle driving data according to an embodiment of the present disclosure will be described hereinafter with reference to FIG. 11. The device 700 includes a processor(s) 701 and a memory 702. The processor(s) 701 may be, for example, a central processing unit (CPU) of the device 700. The processor(s) 701 may be any type of general-purpose processor, or may be a processor specifically designed to clean up vehicle driving data, such as an application specific integrated circuit ("ASIC"). The memory 702 may include various computer-readable medium that can be accessed by the processor(s) 701. In various embodiments, the memory 702 described herein may include volatile and non-volatile medium, removable and non-removable medium. For example, the memory 702 may include any combination of the following: random access memory ("RAM"), dynamic RAM ("DRAM"), static RAM ("SRAM"), read only memory ("ROM"), flash memory, cache memory and/or any other type of non-transitory computer readable medium. The memory 702 may store computer-executable instructions which when executed by the processor 701 cause the processor 701 to perform any one of the methods for cleaning up vehicle driving data according to the embodiments of the present disclosure.

The present disclosure also provides a non-transitory storage medium on which computer-executable instructions are stored. These computer-executable instructions, when being executed by a computer, cause the computer to perform any of the methods for cleaning up vehicle driving data according to the embodiments of the present disclosure.

The following section describes additional aspects and features of the method and system to clean up vehicle driving data or identify/determine abnormal driving data from received vehicle driving data of a vehicle without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:

determining a maximum allowable driving distance of the vehicle within each first sub-time period based on the first vehicle location associated with the first sub-time period;

determining the second mileage based on the maximum allowable driving distance of the vehicle within each first sub-time period; and in response to an amount by which the first mileage is greater than the second mileage exceeds a first predetermined threshold, determining that the first mileage is abnormal data.

A1. The method of paragraph A0, wherein the vehicle mileage data comprises first odometer data at a starting time point of the predetermined time period and second odometer data at an ending time point of the predetermined time period.

A2. The method of paragraph A0, wherein determining the second mileage of the vehicle within the predetermined time period comprises:

determining a maximum vehicle speed allowed for a road section where the vehicle is located within the each first sub-time period based on the first vehicle location associated with the first sub-time period;

determining the maximum allowable driving distance within each first sub-time period based on a length of each first sub-time period and the maximum vehicle speed allowed for the road section where the vehicle is located within the first sub-time period; and determining the second mileage of the vehicle within the predetermined time period based on a sum of the maximum allowable driving distances within the first sub-time periods.

A3. The method of paragraph A0, further comprising:

when the amount by which the first mileage is greater than the second mileage exceeds the first predetermined threshold, receiving one or more surrounding environment images of the vehicle at the one or more first time points; and judging whether a road section determined based on the surrounding environment image at each first time point is consistent with the road section determined based on the first vehicle location at the first time point, and in response that they are consistent, determining that the first mileage is abnormal data, and in response to that they are inconsistent, removing the first vehicle location at the first time point from the first vehicle location data and re-determining the second mileage.

A4. The method of paragraph A0, wherein the vehicle status data comprises second vehicle location data, the second vehicle location data comprises one or more second vehicle locations at one or more second time points within the predetermined time period, and the method further comprises when the amount by which the first mileage is greater than the second mileage does not exceed the first predetermined threshold or when the first mileage is not greater than the second mileage:

determining a driving distance of the vehicle between every two adjacent second time points in the one or more second time points based on the second vehicle locations at the two adjacent second time points;

determining a third mileage based on the driving distance of the vehicle between every two adjacent second time points in the one or more second time points; and in response to an amount by which the first mileage is greater than the third mileage exceeds a second predetermined threshold, determining that the first mileage is abnormal data.

A5. The method of paragraph A0, wherein the vehicle status data comprises vehicle speed data, the vehicle speed data comprises one or more vehicle speeds at one or more third time points within the predetermined time period, each of the one or more vehicle speeds is associated with a corresponding one of one or more third sub-time periods obtained by dividing the predetermined time period according to the one or more third time points, and the method further comprises when the amount by which the first mileage is greater than the second mileage does not exceed the first predetermined threshold or when the first mileage is not greater than the second mileage:

determining a driving distance of the vehicle within each third sub-time period based on the vehicle speed associated with the third sub-time period;

determining a fourth mileage based on the driving distance of the vehicle within each third sub-time period; and in response to an amount by which the first mileage is greater than the fourth mileage exceeds a third predetermined threshold, determining that the first mileage is abnormal data.

A6. The method of paragraph A0, wherein the vehicle status data comprises vehicle energy data, the vehicle energy data comprises energy consumption of the vehicle within the predetermined time period, and the method further comprises when the amount by which the first mileage is greater than the second mileage does not exceed the first predetermined threshold or when the first mileage is not greater than the second mileage:

determining a fifth mileage based on the energy consumption of the vehicle within the predetermined time period; and in response to an amount by which the first mileage is greater than the fifth mileage exceeds a fourth predetermined threshold, determining that the first mileage is abnormal data.

A7. The method of paragraph A0, wherein the vehicle status data comprises vehicle route data, the vehicle route data comprises a vehicle driving route from a starting vehicle location at a starting time point of the predetermined time period to an ending vehicle location at an ending time point of the predetermined time period, and the method further comprises when the amount by which the first mileage is greater than the second mileage does not exceed the first predetermined threshold or when the first mileage is not greater than the second mileage:

querying a database to retrieve a first mileage indicated as not abnormal data from other vehicle, the first mileage of the other vehicle being derived from the other vehicle driving along the vehicle driving route from the starting vehicle location to the ending vehicle location;

comparing the first mileage of the vehicle with the first mileage of the other vehicle; and in response to an amount by which the first mileage of the vehicle is greater than the first mileage of the other vehicle exceeds a fifth predetermined threshold, determining that the first mileage of the vehicle is abnormal data.

A8. The method of paragraph A0, wherein the vehicle status data comprises vehicle route data, the vehicle route data comprises a vehicle driving route from a starting vehicle location at a starting time point of the predetermined time period to an ending vehicle location at an ending time point of the predetermined time period, and the method further comprises when the amount by which the first mileage is greater than the second mileage does not exceed the first predetermined threshold or when the first mileage is not greater than the second mileage:

querying a database to retrieve a first historical mileage indicated as not abnormal data from the vehicle, the first historical mileage being derived from the vehicle having driven along the vehicle driving route from the starting vehicle location to the ending vehicle location;

comparing the first mileage of the vehicle with the first historical mileage of the vehicle; and in response to an amount by which the first mileage of the vehicle is greater than the first historical mileage of the vehicle exceeds a sixth predetermined threshold, determining that the first mileage of the vehicle is abnormal data.

A9. The method of paragraph A0, further comprising:
storing the first mileage and information indicating whether the first mileage is abnormal data in a database.

B0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises second vehicle location data, the second vehicle location data comprises one or more second vehicle locations at one or more second time points within the predetermined time period, and the method comprises:

determining a driving distance of the vehicle between every two adjacent second time points in the one or more second time points based on the second vehicle locations at the two adjacent second time points;

determining the second mileage based on the driving distance of the vehicle between every two adjacent second time points in the one or more second time points; and in response to an amount by which the first mileage is greater than the second mileage exceeds a second predetermined threshold, determining that the first mileage is abnormal data.

B1. The method of paragraph B0, wherein the second mileage is determined based on the driving distance between every two adjacent second time points in the one or more second time points and a first tolerance deviation coefficient.

B2. The method of paragraph B1, wherein the first tolerance deviation coefficient is set based on at least one of the following: a time interval between two adjacent second time points; or a variance of a length of a feasible route between the second vehicle locations at two adjacent time points.

B3. The method of paragraph B0, wherein determining the driving distance of the vehicle between every two adjacent second time points in the one or more second time points based on the second vehicle locations at the two adjacent second time points comprises:

retrieving map data to determine a feasible route between the second vehicle locations at the two adjacent time points; and determining the driving distance of the vehicle between the two adjacent second time points based on a length of the feasible route.

C0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises vehicle speed data, the vehicle speed data comprises one or more vehicle speeds at one or more third time points within the predetermined time period, each of the one or more vehicle speeds is associated with a corresponding one of one or more third sub-time periods obtained by dividing the predetermined time period according to the one or more third time points, and the method comprises:

determining a driving distance of the vehicle within each third sub-time period based on the vehicle speed associated with the third sub-time period;

determining the second mileage based on the driving distance of the vehicle within each third sub-time period; and when an amount by which the first mileage is greater than the second mileage exceeds a third predetermined threshold, judging that the first mileage is abnormal data.

C1. The method of paragraph C0, wherein the second mileage is determined based on the driving distance of the vehicle within each third sub-time period and a second tolerance deviation coefficient.

C2. The method of paragraph C1, wherein the second tolerance deviation coefficient is set based on at least one of the following: a length of the third sub-time period; the vehicle speed associated with the third sub-time period; or a variance of the one or more vehicle speeds.

C3. The method of paragraph C0, wherein the vehicle status data further comprises vehicle acceleration data, the vehicle acceleration data comprises one or more vehicle accelerations at the one or more third time points within the predetermined time period, and wherein determining the driving distance of the vehicle within each third sub-time period comprises determining the driving distance of the vehicle within the third sub-time period based on the vehicle speed associated with each third sub-time period and a corresponding vehicle acceleration.

D0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises vehicle energy data, and the vehicle energy data comprises energy consumption of the vehicle within the predetermined time period, and the method comprises:

determining the second mileage based on the energy consumption of the vehicle within the predetermined time period; and when an amount by which the first mileage is greater than the second mileage exceeds a fourth predetermined threshold, judging that the first mileage is abnormal data.

E0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises vehicle route data, the vehicle route data comprises a vehicle driving route from a starting vehicle location at a starting time point of the predetermined time period to an ending vehicle location at an ending time point of the predetermined time period, and the method further comprises:

querying a database to retrieve a first mileage indicated as not abnormal data from another vehicle, the first mileage of the other vehicle being derived from the another vehicle driving along the vehicle driving route from the starting vehicle location to the ending vehicle location;

comparing the first mileage of the vehicle with the first mileage of the another vehicle; and when an amount by which the first mileage of the vehicle is greater than the first mileage of the other vehicle exceeds a fifth predetermined threshold, judging that the first mileage of the vehicle is abnormal data.

F0. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises vehicle route data, the vehicle route data comprises a vehicle driving route from a starting vehicle location at a starting time point of the predetermined time period to an ending vehicle location at an ending time point of the predetermined time period, and the method further comprises:

querying a database to retrieve a first historical mileage indicated as not abnormal data from the vehicle, the first historical mileage being derived from the vehicle having driven along the vehicle driving route from the starting vehicle location to the ending vehicle location;

comparing the first mileage of the vehicle with the first historical mileage of the vehicle; and when an amount by which the first mileage of the vehicle is greater than the first historical mileage of the vehicle exceeds a sixth predetermined threshold, judging that the first mileage of the vehicle is abnormal data.

G0. A method for cleaning up vehicle driving data, comprising:

receiving vehicle driving data of a vehicle within a predetermined time period, the vehicle driving data comprising first vehicle status data convertible into vehicle mileage and second vehicle status data convertible into vehicle mileage and different from the first vehicle status data;

determining a first mileage of the vehicle within the predetermined time period based on the first vehicle status data;

determining a second mileage of the vehicle within the predetermined time period based on the second vehicle status data; and judging whether the first mileage is abnormal data based on the second mileage, wherein the first vehicle status data comprises vehicle location data, the vehicle location data comprises one or more vehicle locations at one or more first time points within the predetermined time period, and the second vehicle status the data comprises vehicle speed data, the vehicle speed data comprises one or more vehicle speeds at one or more second time points within the predetermined time period, each of the one or more vehicle speeds is associated with a corresponding one of one or more second sub-time periods obtained by dividing the predetermined time period according to the one or more second time points, and wherein, determining the first mileage of the vehicle within the predetermined time period comprises:

determining a driving distance of the vehicle between every two adjacent first time points in the one or more first time points based on the vehicle locations at the two adjacent first time points; and determining the first mileage based on the driving distance of the vehicle between every two adjacent first time points in the one or more first time points, determining the second mileage of the vehicle within the predetermined time period comprises:

determining a driving distance of the vehicle within each second sub-time period based on the vehicle speed associated with the second sub-time period; and determining the second mileage based on the driving distance of the vehicle within each second sub-time period, and determining whether the first mileage is abnormal data comprises:

when an amount by which the first mileage is greater than the second mileage exceeds a predetermined threshold, judging that the first mileage is abnormal data.

H0. An apparatus for cleaning up vehicle driving data, comprising:

a receiving module configured to receive vehicle driving data of a vehicle within a predetermined time period, the vehicle driving data comprising vehicle mileage data and vehicle status data;

a converting module configured to determine a first mileage of the vehicle within the predetermined time period based on the vehicle mileage data and determine a second mileage of the vehicle within the predetermined time period based on the vehicle status data mileage; and a judging module configured to judge whether the first mileage is abnormal data based on the second mileage, wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the converting module is further configured to determine the maximum allowable driving distance of the vehicle within each first sub-time period based on the first vehicle location associated with the first sub-time period and determine the second mileage based on the maximum allowable driving distance of the vehicle within each first sub-time period, and wherein the judging module is further configured to judge that the first mileage is abnormal data when an amount by which the first mileage is greater than the second mileage exceeds a first predetermined threshold.

I0. An apparatus for cleaning up vehicle driving data, comprising:

a receiving module configured to receive vehicle driving data of a vehicle within a predetermined time period, the vehicle driving data comprising first vehicle status data convertible into vehicle mileage and second vehicle status data convertible into vehicle mileage and different from the first vehicle status data;

a converting module configured to:

determine a first mileage of the vehicle within the predetermined time period based on the first vehicle status data; and determine a second mileage of the vehicle within the predetermined time period based on the second vehicle status data; and a judging module configured to judge whether the first mileage is abnormal data based on the second mileage, wherein the first vehicle status data comprises vehicle location data, the vehicle location data comprises one or more vehicle locations at one or more first time points within the predetermined time period, and the second vehicle status the data comprises vehicle speed data, the vehicle speed data comprises one or more vehicle speeds at one or more second time points within the predetermined time period, each of the one or more vehicle speeds is associated with a corresponding one of one or more second sub-time periods obtained by dividing the predetermined time period according to the one or more second time points, wherein the converting module is further configured to:

determine a driving distance of the vehicle between every two adjacent first time points in the one or more first time points based on the vehicle locations at the two adjacent first time points, and determine the first mileage based on the driving distance of the vehicle between every two adjacent first time points in the one or more first time points; and determine a driving distance of the vehicle within each second sub-time period based on the vehicle speed associated with the second sub-time period, and determine the second mileage of the vehicle within each second sub-time period, and wherein the judging module is further configured to judge that the first mileage is abnormal data when an amount by which the first mileage is greater than the second mileage exceeds a predetermined threshold.

J0. A device for cleaning up vehicle driving data, comprising: one or more processors; and a memory for storing computer-executable instructions that when executed by the one or more processors cause the one or more processors to perform the method according to any one of Paragraph A0 to Paragraph G0.

K0. A non-transitory storage medium on which computer-executable instructions are stored, which when executed by a computer cause the computer to execute the method according to any one of Paragraph A0 to Paragraph G0.

As used herein, the word "exemplary" means "serving as an example, instance, or illustration" and not as a "model" to be copied exactly. Any implementation described exemplarily herein is not necessarily construed as being preferred or advantageous over other implementations. Moreover, the present disclosure is not limited by any expressed or implied theory given in the technical field, background art, summary of the invention, or specific embodiments. In addition, for reference purposes only, "first", "second" and similar terms may also be used herein, and thus are not intended to be limiting. For example, unless the context clearly dictates it, the words "first", "second" and other such numerical words referring to structures or elements do not imply an order or sequence. It should also be understood that, when the term "including/comprising" is used herein, it indicates that the specified features, integers, steps, operations, units and/or components are present, but it does not exclude the presence or addition of one or more other features, integers, steps, operations, units and/or components and/or combinations thereof. As used herein, the term "and/or" includes any and all combinations of one or more of the associated listed items. The terms used herein are only for the purpose of describing specific embodiments, and are not intended to limit the present disclosure. As used herein, the singular forms "a", "an" and "the" are also intended to include the plural forms, unless the context clearly dictates otherwise.

Those skilled in the art should realize that the boundaries between the above operations are merely illustrative. Multiple operations may be combined into a single operation, a single operation may be distributed in additional operations, and the operations may be executed at least partially overlapping in time. Also, alternative embodiments may include multiple instances of specific operations, and the order of operations may be changed in other various embodiments. However, other modifications, changes and replacements are also possible. The aspects and elements of all embodiments disclosed above may be combined in any manner and/or in combination with aspects or elements of other embodiments to provide multiple additional embodiments. Therefore, this specification and drawings should be regarded as illustrative rather than restrictive.

Although some specific embodiments of the present disclosure have been described in detail through examples, those skilled in the art should understand that the above examples are only for illustration and not for limiting the scope of the present disclosure. The various embodiments disclosed herein may be combined arbitrarily without departing from the spirit and scope of the present disclosure. Those skilled in the art should also understand that various modifications may be made to the embodiments without departing from the scope and spirit of the present disclosure. The scope of the present disclosure is defined by the appended claims.

What is claimed is:

1. A method for cleaning up vehicle driving data, comprising:
    receiving vehicle driving data of a vehicle within a predetermined time period, the vehicle driving data comprising vehicle mileage data and vehicle status data;
    determining a first mileage of the vehicle within the predetermined time period based on the vehicle mileage data;
    determining a second mileage of the vehicle within the predetermined time period based on the vehicle status data; and
    judging whether the first mileage is abnormal data based on the second mileage,
    wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:
    determining a maximum allowable driving distance of the vehicle within each first sub-time period based on the first vehicle location associated with the first sub-time period;
    determining the second mileage based on the maximum allowable driving distance of the vehicle within each first sub-time period; and
    when an amount by which the first mileage is greater than the second mileage exceeds a first predetermined threshold, judging that the first mileage is abnormal data,
    wherein determining the second mileage of the vehicle within the predetermined time period comprises:
        determining a maximum vehicle speed allowed for a road section where the vehicle is located within the each first sub-time period based on the first vehicle location associated with the first sub-time period;
        determining the maximum allowable driving distance within each first sub-time period based on a length of each first sub-time period and the maximum vehicle speed allowed for the road section where the vehicle is located within the first sub-time period; and
        determining the second mileage of the vehicle within the predetermined time period based on a sum of the maximum allowable driving distances within the first sub-time periods.

2. The method according to claim 1, wherein the vehicle mileage data comprises first odometer data at a starting time point of the predetermined time period and second odometer data at an ending time point of the predetermined time period.

3. The method according to claim 1, further comprising:
    storing the first mileage and information indicating whether the first mileage is abnormal data in a database.

4. A method for cleaning up vehicle driving data, comprising:
    receiving vehicle driving data of a vehicle within a predetermined time period, the vehicle driving data comprising vehicle mileage data and vehicle status data;
    determining a first mileage of the vehicle within the predetermined time period based on the vehicle mileage data;
    determining a second mileage of the vehicle within the predetermined time period based on the vehicle status data; and
    judging whether the first mileage is abnormal data based on the second mileage,
    wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:
    determining a maximum allowable driving distance of the vehicle within each first sub-time period based on the first vehicle location associated with the first sub-time period;
    determining the second mileage based on the maximum allowable driving distance of the vehicle within each first sub-time period; and
    when an amount by which the first mileage is greater than the second mileage exceeds a first predetermined threshold, judging that the first mileage is abnormal data,
    wherein the vehicle status data further comprises vehicle speed data, the vehicle speed data comprises one or more vehicle speeds at one or more third time points within the predetermined time period, each of the one or more vehicle speeds is associated with a corresponding one of one or more third sub-time periods obtained by dividing the predetermined time period according to the one or more third time points, and the method further comprises when the amount by which the first mileage is greater than the second mileage does not exceed the first predetermined threshold or when the first mileage is not greater than the second mileage:
        determining a driving distance of the vehicle within each third sub-time period based on the vehicle speed associated with the third sub-time period;

determining a fourth mileage based on the driving distance of the vehicle within each third sub-time period; and when an amount by which the first mileage is greater than the fourth mileage exceeds a third predetermined threshold, judging that the first mileage is abnormal data.

5. The method according to claim 4, wherein the second mileage is determined based on the driving distance of the vehicle within each third sub-time period and a first tolerance deviation coefficient.

6. The method according to claim 5, wherein the first tolerance deviation coefficient is set based on at least one of the following:
a length of the third sub-time period;
the vehicle speed associated with the third sub-time period; or
a variance of the one or more vehicle speeds.

7. The method according to claim 4, wherein the vehicle status data further comprises vehicle acceleration data, the vehicle acceleration data comprises one or more vehicle accelerations at the one or more third time points within the predetermined time period, and wherein determining the driving distance of the vehicle within each third sub-time period comprises determining the driving distance of the vehicle within the third sub-time period based on the vehicle speed associated with each third sub-time period and a corresponding vehicle acceleration.

8. A method for cleaning up vehicle driving data, comprising:
receiving vehicle driving data of a vehicle within a predetermined time period, the vehicle driving data comprising vehicle mileage data and vehicle status data;
determining a first mileage of the vehicle within the predetermined time period based on the vehicle mileage data;
determining a second mileage of the vehicle within the predetermined time period based on the vehicle status data; and
judging whether the first mileage is abnormal data based on the second mileage,
wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:
determining a maximum allowable driving distance of the vehicle within each first sub-time period based on the first vehicle location associated with the first sub-time period;
determining the second mileage based on the maximum allowable driving distance of the vehicle within each first sub-time period; and
when an amount by which the first mileage is greater than the second mileage exceeds a first predetermined threshold, judging that the first mileage is abnormal data,
wherein the vehicle status data further comprises vehicle energy data, the vehicle energy data comprises energy consumption of the vehicle within the predetermined time period, and the method further comprises when the amount by which the first mileage is greater than the second mileage does not exceed the first predetermined threshold or when the first mileage is not greater than the second mileage:
determining a fifth mileage based on the energy consumption of the vehicle within the predetermined time period; and
when an amount by which the first mileage is greater than the fifth mileage exceeds a fourth predetermined threshold, judging that the first mileage is abnormal data.

9. A method for cleaning up vehicle driving data, comprising:
receiving vehicle driving data of a vehicle within a predetermined time period, the vehicle driving data comprising vehicle mileage data and vehicle status data;
determining a first mileage of the vehicle within the predetermined time period based on the vehicle mileage data;
determining a second mileage of the vehicle within the predetermined time period based on the vehicle status data; and
judging whether the first mileage is abnormal data based on the second mileage,
wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:
determining a maximum allowable driving distance of the vehicle within each first sub-time period based on the first vehicle location associated with the first sub-time period;
determining the second mileage based on the maximum allowable driving distance of the vehicle within each first sub-time period; and
when an amount by which the first mileage is greater than the second mileage exceeds a first predetermined threshold, judging that the first mileage is abnormal data,
wherein the vehicle status data further comprises vehicle route data, the vehicle route data comprises a vehicle driving route from a starting vehicle location at a starting time point of the predetermined time period to an ending vehicle location at an ending time point of the predetermined time period, and the method further comprises when the amount by which the first mileage is greater than the second mileage does not exceed the first predetermined threshold or when the first mileage is not greater than the second mileage:
querying a database to retrieve a first mileage indicated as not abnormal data from other vehicle, the first mileage of the other vehicle being derived from the other vehicle driving along the vehicle driving route from the starting vehicle location to the ending vehicle location;
comparing the first mileage of the vehicle with the first mileage of the other vehicle; and
when an amount by which the first mileage of the vehicle is greater than the first mileage of the other vehicle exceeds a fifth predetermined threshold, judging that the first mileage of the vehicle is abnormal data.

10. A method for cleaning up vehicle driving data, comprising:

receiving vehicle driving data of a vehicle within a predetermined time period, the vehicle driving data comprising vehicle mileage data and vehicle status data;

determining a first mileage of the vehicle within the predetermined time period based on the vehicle mileage data;

determining a second mileage of the vehicle within the predetermined time period based on the vehicle status data; and judging whether the first mileage is abnormal data based on the second mileage, wherein the vehicle status data comprises first vehicle location data, the first vehicle location data comprises one or more first vehicle locations at one or more first time points within the predetermined time period, each of the one or more first vehicle locations is associated with a corresponding one of one or more first sub-time periods obtained by dividing the predetermined time period according to the one or more first time points, and the method comprises:

determining a maximum allowable driving distance of the vehicle within each first sub-time period based on the first vehicle location associated with the first sub-time period;

determining the second mileage based on the maximum allowable driving distance of the vehicle within each first sub-time period; and when an amount by which the first mileage is greater than the second mileage exceeds a first predetermined threshold, judging that the first mileage is abnormal data, wherein the vehicle status data further comprises vehicle route data, the vehicle route data comprises a vehicle driving route from a starting vehicle location at a starting time point of the predetermined time period to an ending vehicle location at an ending time point of the predetermined time period, and the method further comprises when the amount by which the first mileage is greater than the second mileage does not exceed the first predetermined threshold or when the first mileage is not greater than the second mileage:

querying a database to retrieve a first historical mileage indicated as not abnormal data from the vehicle, the first historical mileage being derived from the vehicle having driven along the vehicle driving route from the starting vehicle location to the ending vehicle location;

comparing the first mileage of the vehicle with the first historical mileage of the vehicle; and when an amount by which the first mileage of the vehicle is greater than the first historical mileage of the vehicle exceeds a sixth predetermined threshold, judging that the first mileage of the vehicle is abnormal data.

* * * * *